(No Model.)

B. F. MAHLER.
FLOWER POT.

No. 579,993. Patented Apr. 6, 1897.

Attest:
Geo. H. Botts
A. V. Bourke

Inventor
Benjamin Franklin Mahler
Philipp Mauser Phelps
Attys

UNITED STATES PATENT OFFICE.

BENJAMIN FRANKLIN MAHLER, OF NEW YORK, N. Y.

FLOWER-POT.

SPECIFICATION forming part of Letters Patent No. 579,993, dated April 6, 1897.

Application filed July 3, 1896. Serial No. 597,944. (No model.)

*To all whom it may concern:*

Be it known that I, BENJAMIN FRANKLIN MAHLER, a citizen of the United States, residing at New York, county of New York, and State of New York, have invented certain new and useful Improvements in Flower-Pots, fully described and represented in the following specification and the accompanying drawings, forming a part of the same.

This invention relates to that class of constructions used for holding growing plants in houses and conservatories, and to which the general term of "flower-pot" may be and is hereinafter applied irrespective of the size or shape of the receptacle, the object of the invention being to provide an improved construction of this class.

As a full understanding of the invention can best be given by an illustration and detailed description of a construction embodying the same, such a description will now be given in connection with the accompanying drawings, showing constructions embodying all the features of the invention in their preferred forms, and the features forming the invention will then be specifically pointed out in the claims.

Figure 1:
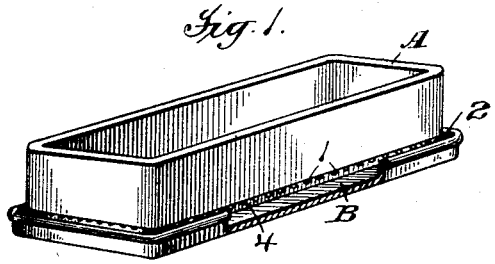
Figure 2:
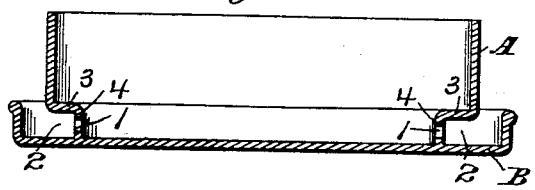
Figure 3:
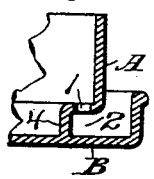

In the drawings, Figure 1 is a perspective view of a rectangular flower-pot such as is used for window decoration, the edge of the drip-pan being partly broken away to show the construction. Fig. 2 is a cross-section of the same on an enlarged scale. Fig. 3 is a similar partial section showing a modification.

Referring to said drawings, A is the flower-pot proper, which is shown as a large rectangular pot, but which may be of any other form and of any suitable size and which may be formed of any suitable material, such as earthenware, metal, or wood. At the base of the pot and preferably formed integral therewith, as shown, is the drip-pan B, of such depth and projection outside the flower-pot as desired, and which may be varied in accordance with the character of the plants for use with which the flower-pot is designed.

In previous constructions the flower-pot has been provided with one or more drip-openings in the base and a drip-pan formed separate from the flower-pot.

My flower-pot is provided with drip-openings 1, of which any suitable number may be used, but which preferably consist of a series of small openings of any suitable size arranged at intervals about the periphery of the pot, these drip-openings being placed in the side walls of the pot, so that the water will pass through them to the drip-pan B. These drip-openings will be placed at the desired level above the base of the flower-pot, according to the results desired, either so that the drip-pan shall connect by these openings with the soil in the bottom of the pot or at a higher level, so that the moisture shall be retained in the soil at the bottom of the pot and the excess flow from a higher level to the drip-pan.

While the walls of the flower-pot may be vertical or inclined, I prefer to form the walls substantially as shown in the drawings, that is, with a reëntrant portion near the base of the pot and preferably at a point about opposite the top of the edge of the drip-pan B, so as to form a drip-space 2, which secures a larger capacity of the drip-pan, while at the same time the latter may project but slightly outside the body of the flower-pot. This drip-space may be formed by inclining inwardly the walls of the pot near the base, either throughout or at intervals, so as to form an inclined reëntrant portion of the walls, but is preferably formed by a substantially horizontal reëntrant portion 3 and vertical portion 4 below the same. The drip-openings 1 are preferably arranged so as to open into this space 2, and, with the construction shown, the drip-openings may be formed either in the vertical portion 4 of the side walls below the horizontal portion 3, as shown in Fig. 2, or in the horizontal portion 3 itself, as shown in Fig. 3, which latter construction will probably be found preferable where the plants for use with which the pot is designed are such that the connection of the bottom layers of soil with the drip-pan is not required, as the openings 1 will thus be entirely concealed and the appearance of the pot improved.

Of course the drip-openings may be formed in the side walls of the pot above the drip-space 2 and the water flow down therefrom to the drip-pan, where the plants are such that this construction is suitable, but it is obvious that such a construction is not so desirable as with the drip-openings opening into the drip-space 2, so as to be below the edge of the drip-pan B and practically concealed.

In the construction shown the drip-space 2 formed by the reëntrant portion of the walls of the flower-pot A extends entirely about the periphery of the pot, but it will be understood that a construction may be used in which the side walls of the pot project inwardly only at intervals, so as to form a series of recesses constituting this space 2, into which the drip-openings 1 open.

Many other modifications may be made in the details of the construction shown without departing from the invention, and I am not to be limited to the exact form or construction illustrated.

What I claim is—

1. A flower-pot having in its side walls near the base of the pot a reëntrant portion so as to form, in combination with a drip-pan, a drip-space and having drip-openings in the walls above the base of the pot opening into the drip-space, substantially as described.

2. A flower-pot having in its side walls near the base of the pot a reëntrant portion forming a drip-space and having a drip-pan formed integral with the flower-pot and having drip-openings in the walls above the base of the pot, substantially as described.

3. A flower-pot having in its side walls near the base of the pot a substantially horizontal reëntrant portion so as to form a drip-space 2, and having drip-openings in the reëntrant portion of the walls of the pot, substantially as described.

4. A flower-pot having in its side walls near the base of the pot a substantially horizontal reëntrant portion so as to form a drip-space 2, and having a drip-pan formed integral with the flower-pot, and having drip-openings in the reëntrant portion of the walls of the pot, substantially as described.

5. A flower-pot having in its side walls near the base of the pot a substantially horizontal reëntrant portion so as to form a drip-space 2, drip-pan B formed integral with the flower-pot, and drip-openings in the walls of the flower-pot opening into said drip-space, substantially as described.

6. Flower-pot A having side walls formed with the substantially horizontal reëntrant portion 3 and vertical portion 4 below the same, drip-pan B integral with the flower-pot, and drip-openings 1 in the reëntrant portion 3, substantially as described.

In testimony whereof I have hereunto set my hand in the presence of two subscribing witnesses.

BENJAMIN FRANKLIN MAHLER.

Witnesses:
C. J. SAWYER,
T. F. KEHOE.